United States Patent [19]

Baumgartner

[11] Patent Number: 5,682,774

[45] Date of Patent: Nov. 4, 1997

[54] APPARATUS FOR ENHANCING THE CLEANING OF LAUNDRY

[75] Inventor: Jesica Baumgartner, St. Gallen, Switzerland

[73] Assignee: Set-High-Tech AG, Wolfhalden, Switzerland

[21] Appl. No.: 598,257

[22] Filed: Feb. 8, 1996

[30] Foreign Application Priority Data

Feb. 9, 1995 [CH] Switzerland ................ 382/95

[51] Int. Cl.⁶ .................. D06F 39/00; C02F 1/48
[52] U.S. Cl. .................. 68/235 R; 210/695; 335/306
[58] Field of Search .................. 204/557; 210/695, 210/222, 223; 68/235 R; 335/302, 303, 306

[56] References Cited

U.S. PATENT DOCUMENTS

| | | | |
|---|---|---|---|
| 2,844,363 | 7/1958 | Clark | 335/302 X |
| 3,059,910 | 10/1962 | Moriya | 210/222 X |
| 3,206,657 | 9/1965 | Moriya | 210/222 X |
| 3,389,794 | 6/1968 | Miyata | 210/222 X |
| 3,546,643 | 12/1970 | Virostek | 335/303 |
| 4,808,306 | 2/1989 | Mitchell | 210/222 |
| 5,096,763 | 3/1992 | Ogata et al. | 335/303 X |
| 5,378,362 | 1/1995 | Schoepe | 210/695 X |

FOREIGN PATENT DOCUMENTS

| | | |
|---|---|---|
| A0 460 248 | 12/1991 | European Pat. Off. . |
| U 93 09 441 | 10/1993 | Germany . |
| U 94 02 545 | 5/1994 | Germany . |
| U 94 11 923 | 11/1994 | Germany . |
| 2042274 | 9/1980 | United Kingdom ............ 210/22 |

*Primary Examiner*—Philip R. Coe
*Attorney, Agent, or Firm*—Sughrue, Mion, Zinn, Macpeak & Seas, PLLC

[57] ABSTRACT

Two or more permanent magnets (2, 3) are sandwiched between two complimentary plastic plates (1) sealed together and disposed in a protective outer cover (20). The device is placed in the wash water of a laundry machine, where its magnetic field induces eddy currents that soften the water. As an alternative, battery powered circuitry may be provided to generate a radiated electromagnetic field, with a similar cleaning enhancement effect.

9 Claims, 3 Drawing Sheets

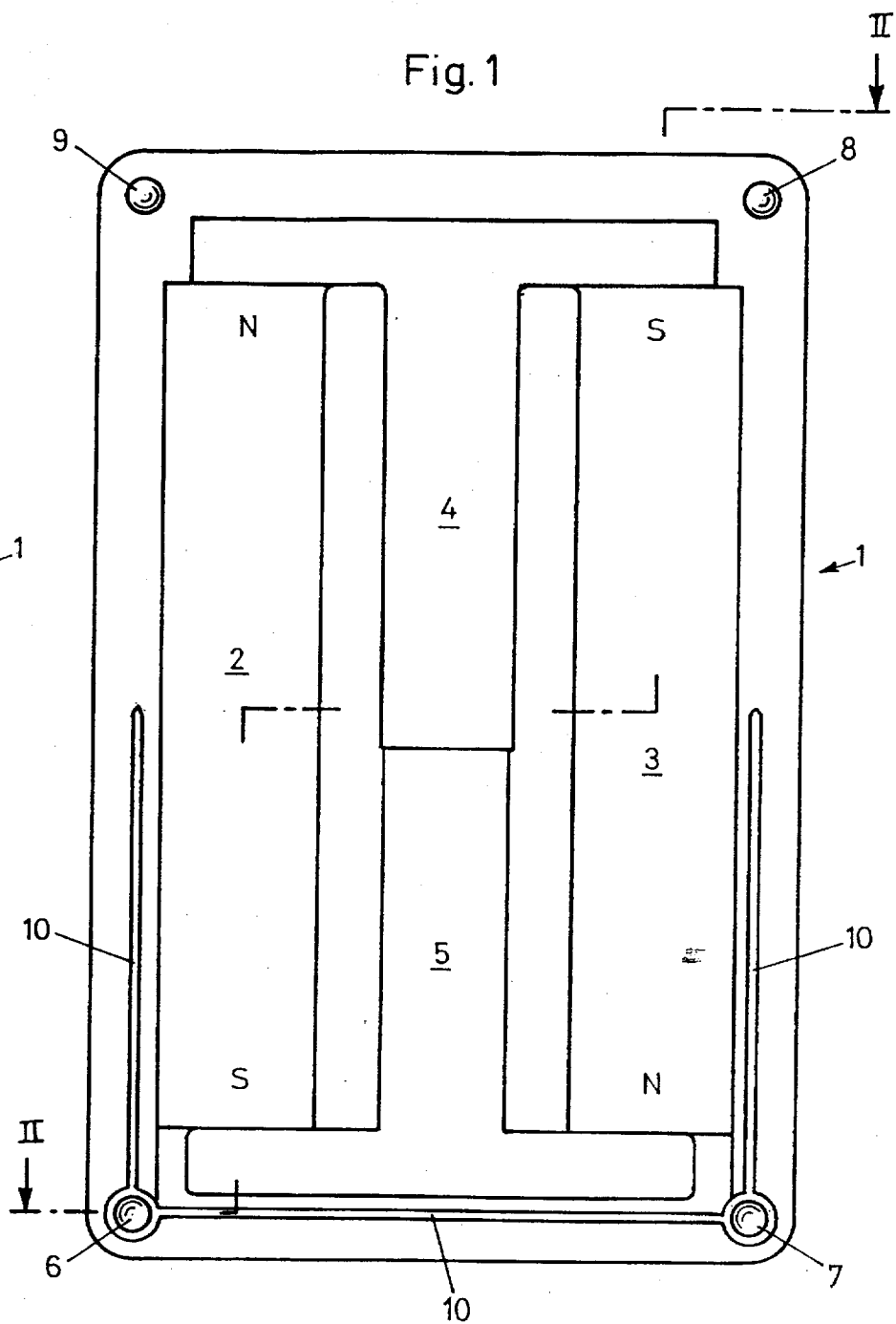
Fig. 3
Fig. 1
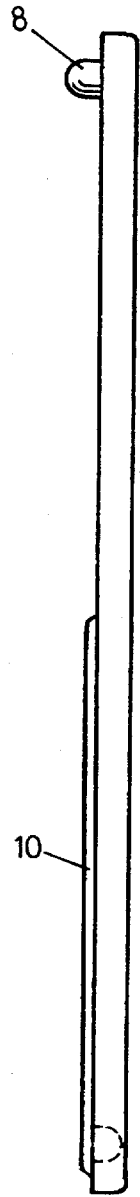
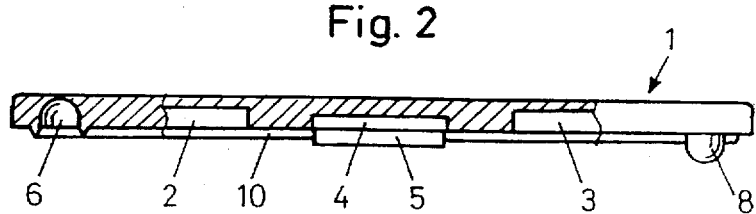
Fig. 2

APPARATUS FOR ENHANCING THE CLEANING OF LAUNDRY

BACKGROUND OF THE INVENTION

This invention relates to a magnetic and/or electromagnetic apparatus for enhancing the cleaning of laundry items in a washing machine.

Ultrasonic devices are often used for the cleaning of objects in a water bath. They produce an ultrasonic wave such that by a series of pressure rises and falls in a frequency region above 20 kHz, small vapor bubbles arise when the momentary local pressure is less than the water vapor pressure, and the vapor bubbles subsequently implode again with the rise in pressure. With this phenomenon, also known as acoustic cavitation, a cleaning effect arises. These ultrasonic-devices indeed work very well, but are disadvantageous in that they are expensive, and they have too small a useful volume to accommodate linens and other large laundry items to be cleaned.

SUMMARY OF THE INVENTION

An object of this invention is therefore to create a device for assisting or enhancing the cleaning of items being laundered, which is less expensive and more practical to use. The device can take the form of a credit card size plastic housing encapsulating permanent magnets and/or circuitry for generating electromagnetic signals, and it is preferably disposed in a protective outer cover to prevent damage as it undergoes turbulent motion inside a washing machine.

BRIEF DESCRIPTION OF THE DRAWINGS

FIG. 1 is a top view of a synthetic plate with depressions in which various modules are lodged, FIG. 2 is a sectional view according to line II—II in FIG. 1, FIG. 3 is a side view of the plate.

DETAILED DESCRIPTION OF THE PREFERRED EMBODIMENTS

Figure 4:
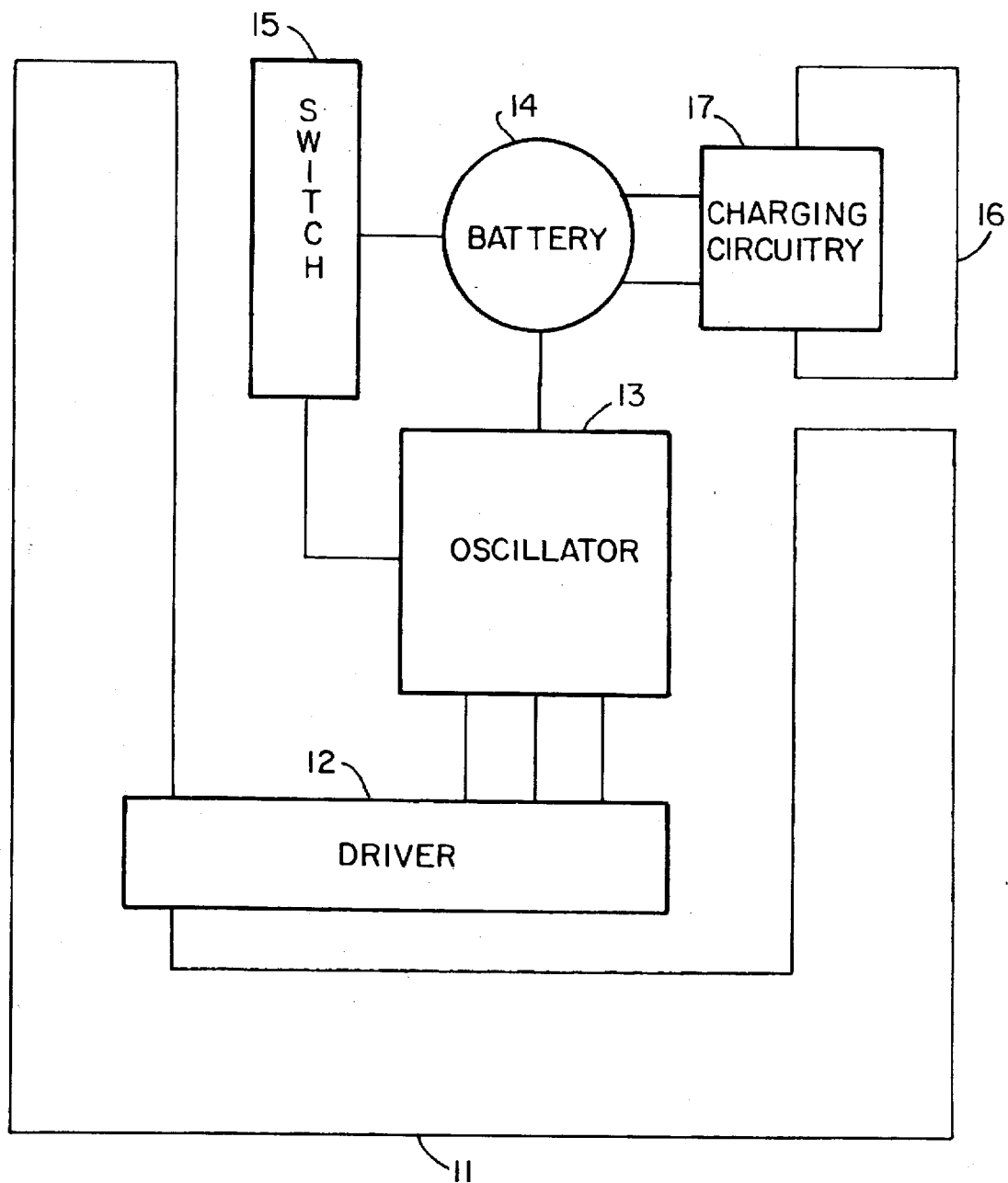
FIG. 4 is a schematic block diagram of the electronic components of an alternate embodiment of or addition to the device.

A synthetic plate 1 according to FIG. 1 is relatively flat and includes two depressions 2, 3, each for a flat, axially magnetized bar magnet, which can also consist of two or more permanent magnets connected in series. The magnets are preferably manufactured from a single magnetic material with high coercive field strength, particularly rare earth compounds. The two magnetic bars or rods are, as shown in FIG. 1, reverse magnetized in order to form a relatively closed magnetic circuit even though one magnetic bar is disposed on the left side and the other on the right side of the elongated synthetic plate (FIG. 1) such that the two magnets have a relatively large separation between them.

The synthetic plate has a T-shaped depression 4 and a T-shaped raised area 5. At each of two corners of the plate 1, there is a small round recess 6, 7, and at each of the other two corners a knob 8, 9 is formed. The plate is provided with a thin, raised bead 10.

The device according to the invention includes two synthetic plates according to FIG. 1, which are pressed together with the magnets sandwiched between them and fused or welded, with the knobs 8, 9 of one plate engaged in the recesses 6, 7 of the other plate. After the welding of the plates provided with the two permanent magnet bars in the depressions 2 and 3, a very handy, hermetically sealed flat device arises in the form of a credit card, which can be thrown into a washing machine of any type with ease. This increases the effectiveness of the detergent during the laundering of linens, clothing, etc.

The device according to the invention, with the two built-in permanent magnet bars functions as follows: Since the device is constructed flat in the form of a credit card and is also relatively light, it moves about readily in the wash water so that eddy currents are induced in the ionized water by its motion, which effects a very slight decomposition of dissolved salts and also, in very small amounts, of the water. This reduces the effect of hardness formers, such as calcium and magnesium. Tests have shown that the water becomes "softer" as a result of the invention-related device due to the reduction or the breakdown of the calcium and magnesium ions. This brings with it the advantage in that linen or other dirty objects can be cleaned in a washing machine in which a device according to the invention has been placed, with much less detergent. In the usual detergents, so-called builders, or structural materials, contained in the detergent assume the task of "softening". These builders break down the hardness formers such as calcium and magnesium, i.e. reduce them. To eliminate the effect of the calcium and magnesium ions, softeners, bleaching agents and surfactants are used which effect a dispersion of dirt; however they also affect the ecological system negatively as a result. The device according to the invention influences the effect of the other detergent components in dramatic fashion, and these components are thus needed in considerably smaller amounts, which has a considerable ecological advantage.

In an alternate embodiment of the invention, the assembled and welded plates 1 sandwich a conducting loop 11 (FIG. 4) acting as an antenna which is connected to a microcomputer or oscillator 13 over a driver stage 12 which can be fed by a battery or accumulator 14. The device can also have a magnetic switch or discriminator 15 to turn the battery or accumulator 14 on or off, as well as a second loop 16 acting as an antenna which is connected to the accumulator 14 over a charging circuit 17.

In operation, the accumulator is normally shut off, i.e. the microcomputer 13 and the driver stage 12 are not connected to the accumulator. To place the unit in service, the upper edge of the device, i.e. the discriminator, 15, is placed in contact for a short time with soft iron. An electrical connection between the accumulator 14 and the components 13 and 12 is then produced. All this is meant to conserve accumulator energy. After activation of the discriminator 15, the components 13 and 12 remain on either for a predetermined time, for example 2 to 5 hours, or until the edge of the device is again placed in contact with soft iron for a very short time.

By means of an inner memory of the discriminator 15, the battery or accumulator 14 is connected by the contact with the soft iron if it was disconnected, or disconnected if it was connected. The discriminator 15 can, for example, include a reed-type magnetic switch, or it can be activated by another physical principle. It is also possible to provide a second discriminator for disconnection.

When the microcomputer 13 is turned on, it produces a sequence of impulses which proceed over the driver stage 12 to the antenna 11. These impulses can have a saw-tooth shape or a sweeping frequency path. The microcomputer 13 acts accordingly as a frequency synthesizer.

The antenna 16 can be provided to charge the accumulator 14 with the help of an exterior energy source. If the washing machine motor emits an electromagnetic field, for example, which is picked up by the antenna 16 or perhaps the antenna 11, the accumulator 14 and/or the discriminator 15 can be omitted.

The cleaning enhancement effect of the permanent magnets is improved and augmented by the electromagnetic impulses emanated by the antenna 11.

Preferably, metallic conducting tracks are pressed onto the synthetic plates 1 to form the antenna 11 or antennas 11, 16, or they can be imprinted onto the outer surface of the device.

The device according to the invention preferably consists of heat-resistant, recyclable components. The plates 1 can be constructed from, for example, Luranyl®, and have dimensions of 6 to 12 cm in length×4 to 7 cm in width and 3 to 10 mm thickness.

Figure 5:
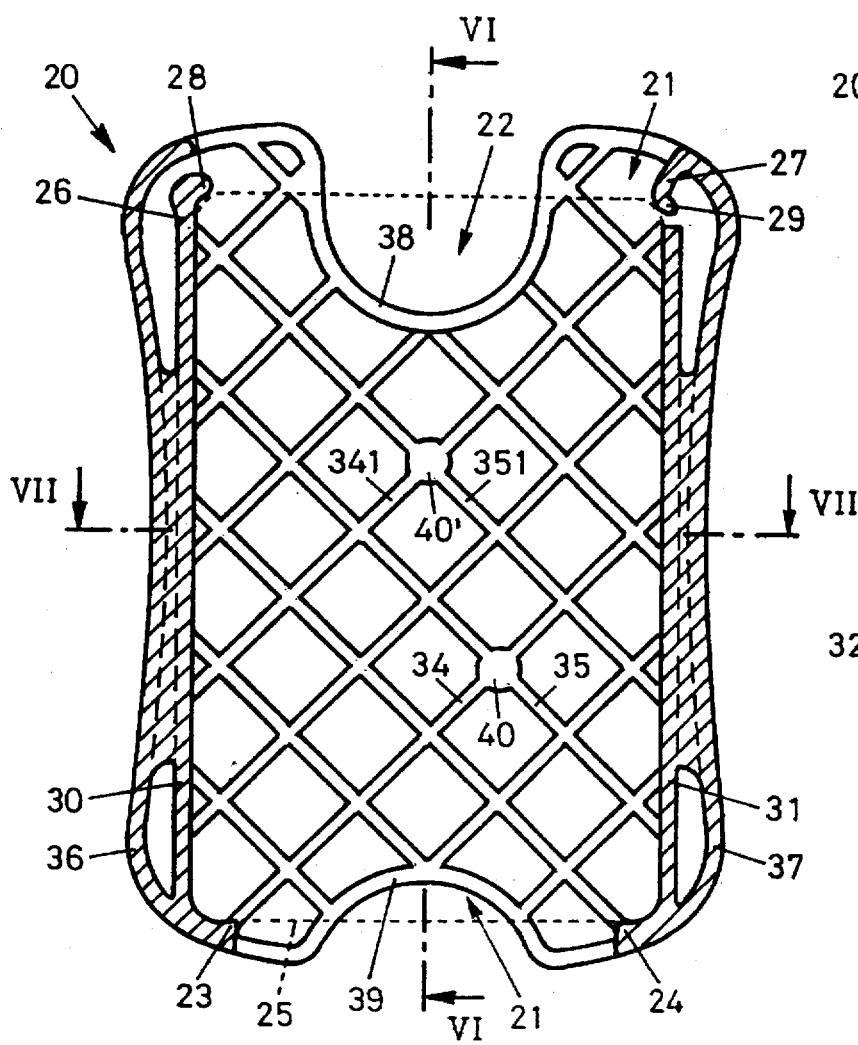
FIG. 5 is a bottom sectional view of a basket-shaped protective covering for the synthetic plate, taken on line V—V in FIG. 7.
Figure 6:
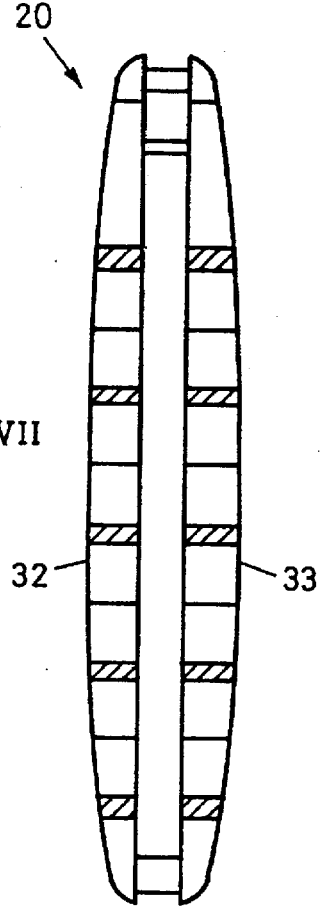
FIG. 6 is a sectional view taken on line VI—VI in FIG. 5.
Figure 7:
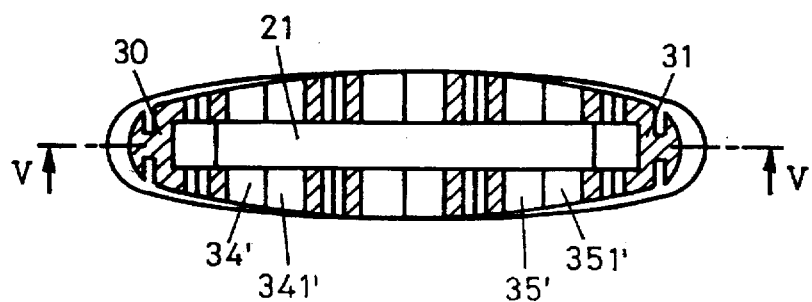
FIG. 7 is a sectional view taken on line VII—VII in FIG. 5.

A basket-shaped protective cover 20 for the device, shown in FIGS. 5 to 7, has an interior 21 which houses a sealed pair of synthetic plates according to the invention. The interior 21 has a mouth or opening 22 into which the plate is inserted. At the bottom of the protective cover 20, shoulders 23, 24 are provided to engage the lower corners of the plate, whose positioning is illustrated by the dashed line 25 in FIG. 5. In the upper area of the protective cover, ledges or flanges 26, 27 are formed in one piece with the cover for engaging the upper corners of the plate assembly. The elastic ledges 26, 27 are arranged at a tilt and have widened sections 28, 29 such that the plate assembly can be inserted into the interior 21 with a slight deforming of the ledges, and when it reaches the shoulders 23, 24, the ledges 26, 27 return to their original positions and the plate assembly is held fast.

The protective cover 20 has two elongated lateral walls 30, 31 whose breadth is larger than the width of the space 21 provided for the plate assembly. The breadth of the walls 30, 31 can also be larger in their central region than on the ends as illustrated by the bows 32, 33 in FIG. 6. The upper edge of wall 30 is connected by a plurality of ribs 34, 341, . . . and 35, 351 . . . to the upper edge of wall 31. In like fashion, the lower edge of wall 30 is connected by ribs 34', 341', . . . and 35', 351', . . . (FIG. 7) with the lower edge of wall 31. The protective cover 20 has two additional elongated lateral protective walls 36, 37 connected on the outside with each of the walls 30, 31. The walls 36, 37 are connected by two thin bowed ribs 38, 39 at their upper and lower regions, and the ribs 34, 35, . . . and 34', 35', . . . are also connected to them.

The sealed plate assembly is thus housed in the basket-shaped protective cover, whereby the permanent magnets and/or circuit components (FIG. 4) for producing an electromagnetic field are held at a distance from the iron parts of the washing machine or wash drum which could be present and which possibly could produce an unfavorable reduction of the magnetic field. In addition, the bow-shape of the protective cover prevents possible damage to the wash items.

The honeycombed structure resulting from the ribs 34, 34', . . . 35, 35', . . . enables the wash water to reach the surface of the inserted plate assembly in an optimal fashion.

The protective cover can, in addition, be provided with a lasting fragrance ingredient which replaces the lessening perfume function of the reduced amount of detergent. Besides this, openings on both flat sides of the protective cover are provided, into which detergent or other substances may be placed in tablet form. To optimize the welding, the walls 30 and 36 or 31 and 37 can have weld beads consisting of a notch and crest.

If the plate assembly is provided without a basket-shaped protective cover, it can be flat but with two broad sides bowed outward. The protective cover can be designed to accommodate two plate assemblies, wherein the permanent magnet is housed in one and the circuitry for producing the electromagnetic waves is housed in the other. The device can be constructed with only the permanent magnets, or only with the circuitry to produce the electromagnetic waves, or with both.

The flanges 26, 27 can be connected to the rib 38 (FIG. 5, to the right), or they can be constructed from a portion of the wall 30 or 31 and be separated from the rib 38 by an air gap (FIG. 5, left). The ribs 34, 35, . . . 34', 35', . . . can form square cells (FIG. 5) or polygonal cells, whereby the intersections between the ribs 34, 35 can form node-like thickened areas 40. The honeycombed sides of the protective cover 20 are thus constructed by open ribs 34, 35, . . . 34', 35', . . . crossing one another. In both variations, the plate assembly can be removed from the protective cover by spreading the flanges 26, 27 and also by pressure on the region of the opening 21 defined by rib 39 and/or by pulling at opening 22.

I claim:

1. A device for enhancing the cleaning of laundry items, comprising:
    a) a water-proof housing (1) consisting of essentially electromagnetically neutral material, and
    b) means for producing a magnetic field disposed within the housing, the device being adapted to be placed in wash water in a laundry machine,
    c) wherein the housing is flared on the outside,
    d) wherein the flaring is formed by a basket-shaped protective cover (20) with a plate-like interior, and
    e) wherein the housing is constructed flat and plate-like, and is snugly disposed in the plate-like interior.

2. A device according to claim 1, wherein the magnetic field producing means comprises two elongate permanent magnets (2, 3) spaced apart and oriented with opposite polarities.

3. A device for enhancing the cleaning of laundry items, comprising:
    a) a water-proof housing (1) consisting of essentially electromagnetically neutral material, and
    b) means for producing a magnetic field disposed within the housing, the device being adapted to be placed in wash water in a laundry machine,
    c) wherein the means for producing a magnetic field comprises electronic circuitry for producing electromagnetic waves (12, 13, 14), and an electrically conducting loop (11) acting as an antenna and connected to an output of said circuitry.

4. A device according to claim 3, wherein said circuitry emits electromagnetic impulses with a changing frequency.

5. A device according to claim 3, wherein the conducting loop (11) is a conducting track pressed onto a printed circuit board or directly inside on the housing, and the housing comprises two complementary plate sections sealed together.

6. A device according to claim 1, wherein the protective cover has an opening (22) for the insertion of the plate-like housing, and elastic flanges (26, 27) are disposed in the area of the opening for holding the housing in the interior of the protective cover.

7. A device according to claim 3, wherein the means for producing a magnetic field comprises a microcomputer (13) and/or a quartz oscillator.

8. A device according to claim 3, further comprising switch means (15) for connecting and disconnecting a built-in battery to the circuitry, said switch means being activatable from the outside.

9. A device according to claim 1, wherein sides of the protective cover (20) are formed by open ribs (34, 35, . . . 34', 35', . . . ) crossing one another in a honeycomb manner.

* * * * *